(12) United States Patent
Kim et al.

(10) Patent No.: US 9,225,195 B2
(45) Date of Patent: Dec. 29, 2015

(54) WIRELESS POWER RECEIVER FOR INCREASED CHARGING EFFICIENCY

(71) Applicant: Samsung Electronics Co., Ltd., Gyeonggi-do (KR)

(72) Inventors: Yu-Su Kim, Gyeonggi-si (KR); Kang-Ho Byun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 195 days.

(21) Appl. No.: 13/956,992

(22) Filed: Aug. 1, 2013

(65) Prior Publication Data

US 2014/0139180 A1    May 22, 2014

(30) Foreign Application Priority Data

Nov. 20, 2012   (KR) .................. 10-2012-0131534

(51) Int. Cl.
*H02J 7/00* (2006.01)
*H02J 7/02* (2006.01)

(52) U.S. Cl.
CPC ......... *H02J 7/025* (2013.01); *H02J 2007/0096* (2013.01)

(58) Field of Classification Search
CPC ........... H02J 7/025; H02J 5/005; H02J 17/00; H02J 2007/0096; H02J 7/0098; H02J 7/0027
USPC ....................................................... 320/108
See application file for complete search history.

(56) References Cited

U.S. PATENT DOCUMENTS

| | | | | |
|---|---|---|---|---|
| 2008/0290738 | A1* | 11/2008 | Greene et al. ................. | 307/145 |
| 2010/0181961 | A1* | 7/2010 | Novak et al. .................. | 320/108 |
| 2011/0156636 | A1 | 6/2011 | Kim | |
| 2013/0005252 | A1* | 1/2013 | Lee et al. ..................... | 455/41.1 |
| 2014/0015335 | A1* | 1/2014 | Lee et al. ..................... | 307/104 |

FOREIGN PATENT DOCUMENTS

KR      101097263      12/2011

* cited by examiner

*Primary Examiner* — Vuthe Siek
(74) *Attorney, Agent, or Firm* — The Farrell Law Firm, P.C.

(57) ABSTRACT

A wireless power receiver for receiving charging power from a wireless power transmitter includes a power reception unit configured to receive the charging power, a rectification unit configured to rectify charging power provided by the power reception unit, and output charging power in a form of Direct Current (DC), a charging unit configured to store charging power, and a power processing Integrated Chip (IC) configured to convert a voltage of the output rectified charging power, into at least one voltage, that an operation of the wireless power receiver requires, and output power having the at least one voltage. Accordingly, charging efficiency is increased.

15 Claims, 5 Drawing Sheets

WIRELESS POWER RECEIVER FOR INCREASED CHARGING EFFICIENCY

PRIORITY

This application claims priority under 35 U.S.C. §119(a) to a Korean patent application filed on Nov. 20, 2012 in the Korean Intellectual Property Office and assigned Serial No. 10-2012-0131534, the contents of which are incorporated herein by reference.

BACKGROUND OF THE INVENTION

1. Field of the Invention

The present invention relates generally to a wireless power receiver, and more particularly, to a wireless power receiver for increased charging efficiency.

2. Description of the Related Art

Mobile terminals such as mobile phones and Personal Digital Assistants (PDAs) are powered by rechargeable batteries that are charged with electrical energy by a separate charging device. Typically, a separate contact terminal is formed at the outer side of each of the charging device and the battery, which are electrically connected to each other through a contact between the two separate contact terminals.

However, in such a contact-type charging scheme, the contact terminals protrude outwardly and become easily contaminated by foreign substances and moisture, causing incorrect battery charging.

In order to solve the above-mentioned problems, a wireless non-contact charging technology has recently been developed and used in many electronic devices.

Such a wireless charging technology uses wireless power transmission and reception, and corresponds to, for example, a system in which a battery is automatically charged when placed on a charging pad without connecting the mobile phone to a separate charging connector. The use of the wireless charging technology is well known in a wireless electric toothbrush or a wireless electric shaver. The wireless charging technology improves a waterproof function since it wirelessly charges the electronic devices, and improves the portability of the electronic devices because it does not require a wired charger. It is expected that the development of technologies related to the wireless charging technology will be significantly furthered in the coming age of electric cars.

The wireless charging technologies are generally classified into an electromagnetic induction scheme using a coil, a resonance scheme using resonance, and a Radio Frequency (RF)/microwave radiation scheme for converting electrical energy into a microwave and transmitting the microwave.

Until now, the wireless charging technology using the electromagnetic induction scheme has been the mainstream. However, recent experiments in which power is wirelessly transmitted over a distance of several tens of meters by using microwaves have been successful at home and abroad. Accordingly, it is expected that an environment in which all electronic devices can be wirelessly charged anywhere and anytime will be realized in the near future.

A power transmission method using electromagnetic induction corresponds to a scheme for transmitting power between a primary coil and a secondary coil. When a magnet approaches the coil, an induced current is generated. A transmission side generates a magnetic field by using the induction current, and a reception side generates electrical energy by inducing a current according to a change in the magnetic field. This phenomenon is known as a magnetic induction phenomenon, and the power transmission method using this phenomenon has excellent energy transmission efficiency.

With respect to the resonance scheme, in 2005, a system was developed in which electricity is wirelessly transferred from a charging device to a device to be charged by using a power transmission principle of the resonance scheme known as a coupled mode theory even when the device to be charged is several meters away from the charging device. This wireless charging system employs the physics concept of resonance, by which when a tuning fork oscillates at a particular frequency, a wine glass next to the tuning fork will oscillate at the same frequency. An electromagnetic wave containing electrical energy was caused to resonate instead of causing sound to resonate. It is known that the resonant electrical energy does not affect surrounding machines and human bodies differently from other electromagnetic waves because the resonant electrical energy is directly transferred only to a device having a resonance frequency, and its unused part is reabsorbed into an electromagnetic field instead of spreading in the atmosphere.

A wireless power receiver according to the related art includes a Direct Current (DC)/DC converter for DC/DC converting charging power which has been received and rectified, and a charger for delivering the DC/DC converted charging power to a charging unit. Specifically, the wireless power receiver according to the related art independently includes the charger and the DC/DC converter, and thus has a problem of an increase in mounting area.

Moreover, the wireless power receiver according to the related art has a problem in that the two independent units may reduce overall charging efficiency. Specifically, the charging efficiency of the wireless power receiver according to the related art is determined by the efficiency of the DC/DC converter multiplied by that of the charger. Accordingly, the overall charging efficiency is reduced. Therefore, it is required to develop a wireless power receiver which enables a reduction in the mounting area together with an increase in the overall charging efficiency.

In this regard, a need exists for a wireless power receiver including a power processing Integrated Chip (IC) that serves as a charger simultaneously with performing DC/DC conversion, and a control method thereof.

SUMMARY OF THE INVENTION

Aspects of the present invention are to address at least the above-mentioned problems and/or disadvantages and to provide at least the advantages described below. Accordingly, an aspect of the present invention is to provide a wireless power receiver including a power processing IC that serves as a charger simultaneously with performing DC/DC conversion, and a control method thereof.

In accordance with an aspect of the present invention, a wireless power receiver configured to receive charging power from a wireless power transmitter includes a power reception unit configured to receive the charging power from the wireless power transmitter, a rectification unit configured to rectify charging power provided by the power reception unit, and to output charging power in a form of DC, a charging unit configured to store charging power, and a power processing IC that is connected to both the rectification unit and the charging unit, and is configured to convert a voltage of the rectified charging power, that the rectification unit has output, into at least one voltage, that an operation of the wireless power receiver requires, and output power having the at least one voltage.

In accordance with another aspect of the present invention, a power processing IC connected to a wireless power receiver configured to receive charging power from a wireless power transmitter includes a wireless power input terminal configured to receive, as an input, wirelessly-received charging power, a wired power input terminal configured to receive, as an input, charging power received by wire, a wireless power processing circuit configured to convert a voltage of the charging power, that the wireless power input terminal provides, into at least one voltage, that an operation of the wireless power receiver requires, and output power having the at least one converted voltage, and a wired power processing circuit configured to convert a voltage of the charging power, that the wired power input terminal provides, into at least one voltage, that an operation of the wireless power receiver requires, and output power having the at least one converted voltage.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as examples. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including ordinal numbers such as first and second may be used herein to describe various elements, these elements should not be limited by these terms. These terms are only used to distinguish one element from another. For example, a first element could be termed a second element, and similarly, a second element could be termed a first element, without departing from the scope of right of the present invention. The terminology used herein is for the purpose of describing particular embodiments only, and is not intended to limit the present invention. As used herein, the term "and/or" includes any and all combinations of one or more of the associated listed items.

Figure 1:
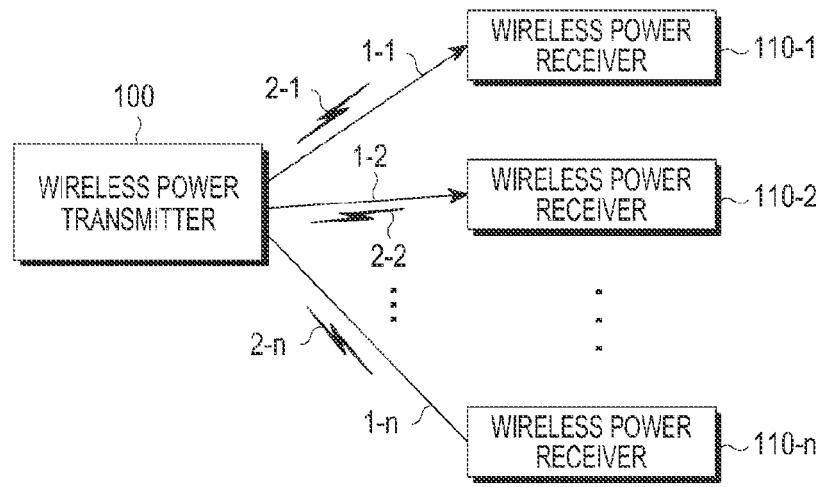
FIG. 1 illustrates an overall configuration and operation of a wireless charging system.

FIG. 1 illustrates an overall configuration and operation of a wireless charging system. Referring to FIG. 1, the wireless charging system includes a wireless power transmitter 100 and one or more wireless power receivers 110-1, 110-2 and 110-n.

The wireless power transmitter 100 may wirelessly transmit power 1-1, power 1-2 and power 1-n to the one or more wireless power receivers 110-1, 110-2 and 110-n, respectively. Specifically, the wireless power transmitter 100 may wirelessly transmit power 1-1, power 1-2 and power 1-n to only the wireless power receivers authenticated after undergoing an authentication procedure.

The wireless power transmitter 100 forms an electrical connection to the wireless power receivers 110-1, 110-2 and 110-n. For example, the wireless power transmitter 100 transmits wireless power having a form of an electromagnetic wave to each of the wireless power receivers 110-1, 110-2 and 110-n.

The wireless power transmitter 100 performs bidirectional communication with the wireless power receivers 110-1, 110-2 and 110-n, which processes or transmits and receive packets 2-1, 2-2 and 2-n each including predetermined frames. Such a frame will be described in more detail below. The wireless power receiver may be implemented, particularly, by using a mobile communication terminal, a Personal Data Assistant (PDA), a Personal Media Player (PMP), or a smart phone, for example.

The wireless power transmitter 100 may wirelessly provide power to the multiple wireless power receivers 110-1, 110-2 and 110-n, for example, in the resonance scheme. When the wireless power transmitter 100 employs the resonance scheme, it is desirable that a distance between the wireless power transmitter 100 and the multiple wireless power receivers 110-1, 110-2 and 1110-n may be greater than or equal to 30 m. When the wireless power transmitter 100 employs the electromagnetic induction scheme, it is desirable that a distance between the apparatus for providing power 100 and the multiple wireless power receivers 110-1, 110-2 and 110-n may be greater than or equal to 10 cm.

Each of the multiple wireless power receivers 110-1, 110-2 and 1110-n receives wireless power from the wireless power transmitter 100, and may charge a battery included therein. Also, each of the multiple wireless power receivers 110-1, 110-2 and 1110-n transmits, to the wireless power transmitter 100, a signal for requesting the transmission of wireless power, information required to receive wireless power, state information of a wireless power receiver, or control information required by the wireless power transmitter 100. Information of the signal transmitted to the wireless power transmitter 100 will be described in more detail below.

Each of the multiple wireless power receivers 110-1, 110-2 and 1110-$n$ transmits a message indicating a charging status thereof to the wireless power transmitter 100.

The wireless power transmitter 100 includes a display means such as a display unit, and displays a state of each of the multiple wireless power receivers 110-1, 110-2 and 1110-$n$ based on a message received from each of the multiple wireless power receivers 110-1, 110-2 and 1110-$n$. The wireless power transmitter 100 displays an expected time period until the charging of each of the multiple wireless power receivers 110-1, 110-2 and 1110-$n$ is completed, together with the state of each of the multiple wireless power receivers 110-1, 110-2 and 1110-$n$.

The wireless power transmitter 100 transmits a control signal for disabling a wireless charging function of each of the multiple wireless power receivers 110-1, 110-2 and 1110-$n$. A wireless power receiver which has received the control signal for disabling the wireless charging function from the wireless power transmitter 100, may disable the wireless charging function thereof.

Figure 2A:
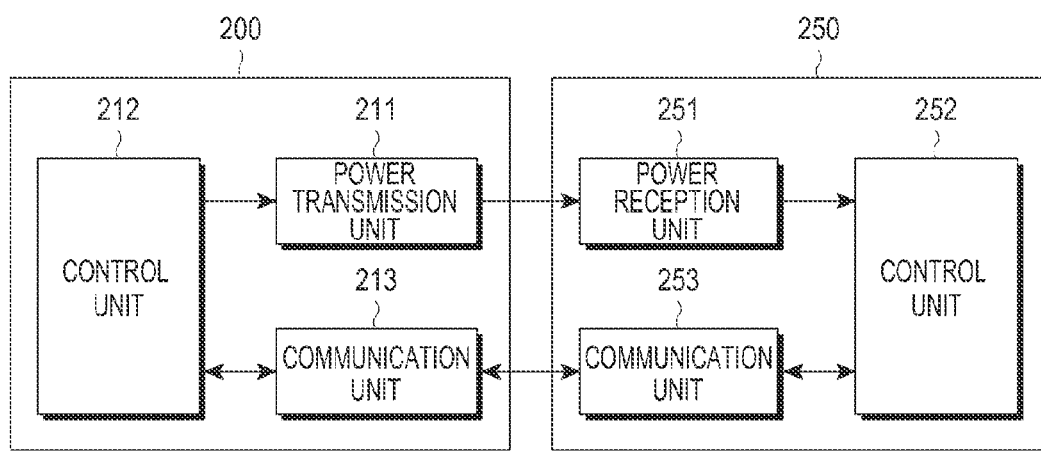
FIG. 2A illustrates configurations of a wireless power transmitter and a wireless power receiver according to an embodiment of the present invention.

FIG. 2A illustrates configurations of a wireless power transmitter and a wireless power receiver according to an embodiment of the present invention.

Referring to FIG. 2A, the wireless power transmitter 200 includes a power transmission unit 211, a control unit 212, and a communication unit 213. The wireless power receiver 250 includes a power reception unit 251, a control unit 252, and a communication unit 253.

The power transmission unit 211 provides power that the wireless power transmitter 200 requires, and may wirelessly provide power to the wireless power receiver 250. The power transmission unit 211 may supply power in the form of Alternating Current (AC). Otherwise, while supplying power in the form of DC, the power transmission unit 211 converts the power in the form of DC into power in the form of AC by using an inverter, and thereby may supply the power in the form of AC. The power transmission unit 211 may be implemented in the form of a built-in battery, or of an interface for receiving power, and may serve to receive power from outside of the transmitter and supply the received power to other elements than itself. Those skilled in the art will easily understand that the power transmission unit 211 is not limited if it corresponds to any means capable of providing power having a predetermined AC waveform.

The power transmission unit 211 provides power having an AC waveform to the wireless power receiver 250 in the form of an electromagnetic wave. The power transmission unit 211 may additionally include a loop coil, and may transmit or receive an electromagnetic wave. An inductance L of the loop coil may be changed when the power transmission unit 211 is implemented as a loop coil. Those skilled in the art will easily understand that the power transmission unit 211 is not limited if it corresponds to any means capable of transmitting and receiving electromagnetic waves.

The control unit 212 controls an overall operation of the wireless power transmitter 200, such as by using an algorithm, a program or an application, which is read from a storage unit (not shown) and is required for control. The control unit 212 may be implemented in the form of a Central Processing Unit (CPU), a microprocessor, or a minicomputer, for example. A detailed operation of the control unit 212 will be described in more detail below.

The communication unit 213 may communicate with the wireless power receiver 250 by using a predetermined scheme. The communication unit 213 may communicate with the communication unit 253 of the wireless power receiver 250 by using a Near Field Communication (NFC) scheme, a Zigbee® scheme, an Infrared Data Association (IrDA) scheme, a Visible Light Communication (VLC) scheme, a Bluetooth® scheme, a Bluetooth® low energy scheme, for example. The communication unit 213 according to an embodiment of the present invention may communicate by using the Zigbee® scheme which is based on an IEEE802.15.4 scheme, or the Bluetooth® low energy scheme. The communication unit 213 may use a Carrier Sense Multiple Access/Collision Avoidance (CSMA/CA) algorithm. A configuration for selecting a frequency and a channel that the communication unit 213 uses will be described in more detail below.

The communication schemes as described above are for illustrative purposes only. Accordingly, the scope of the right of the present invention is not limited by a particular communication scheme that the communication unit 213 employs.

The communication unit 213 transmits a signal including information of the wireless power transmitter 200. The communication unit 213 may unicast, multicast, or broadcast the signal. The signal includes, for example, the type of a protocol of a communication scheme, a network IDentification (ID) of the wireless power transmitter 200, and information indicating wireless power receivers each of which is to perform a report to the wireless power transmitter 200.

The communication unit 213 receives power information from the wireless power receiver 250. The power information includes at least one of capacity, battery residual quantity, the number of times of charging, usage, battery capacity, and battery ratio of the wireless power receiver 250. The communication unit 213 transmits a charging function control signal for controlling a charging function of the wireless power receiver 250. The charging function control signal may be a control signal which controls the wireless power reception unit 251 of the particular wireless power receiver 250 to enable or disable the charging function of the particular wireless power receiver 250.

The communication unit 213 receives a signal from another wireless power transmitter (not shown) as well as from the wireless power receiver 250.

As illustrated in FIG. 2A, the power transmission unit 211 and the communication unit 213 are implemented in different hardware elements and the wireless power transmitter 200 performs communication in an out-band form. However, this configuration is described for illustrative purposes only, and the present invention is not limited to this configuration. In contrast, according to another embodiment of the present invention, the power transmission unit 211 and the communication unit 213 may be implemented in one hardware element, and the wireless power transmitter 200 performs communication in an in-band form.

The wireless power transmitter 200 and the wireless power receiver 250 transmit and receive various signals. Accordingly, it is possible to perform a process of subscribing the wireless power receiver 250 to the wireless power network and a charging process using the transmission and reception of wireless power, which the wireless power transmitter 200 controls.

Figure 2B:
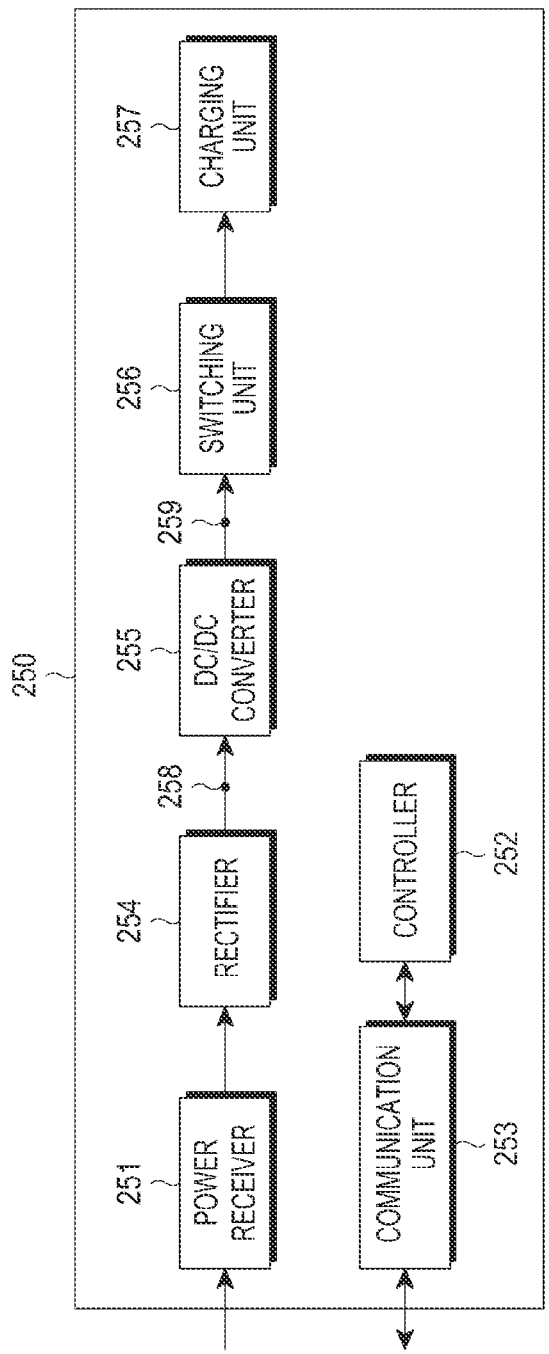
FIG. 2B illustrates a configuration of a wireless power receiver according to a comparative example of the present invention.

FIG. 2B illustrates a configuration of a wireless power receiver according to a comparative example of the present invention.

Referring to FIG. 2B, the wireless power receiver 250 includes a power reception unit 251, a control unit 252, a communication unit 253, a rectification unit 254, a DC/DC conversion unit 255, a switching unit 256, and a charging unit 257.

A detailed description of the power reception unit 251, the control unit 252 and the communication unit 253 will be omitted in order to avoid redundancy. The rectification unit 254 may rectify wireless power, which the power reception unit 251 receives, in the form of DC, and for example, may be implemented in the form of a diode bridge. The DC/DC conversion unit 255 converts the rectified power by a preset gain. For example, the DC/DC conversion unit 255 converts the rectified power in such a manner that an output side 259 has a voltage of 5 V. Minimum and maximum values of a voltage which may be applied to an input side 258 of the DC/DC conversion unit 255 may be previously set.

The switching unit 256 connects the DC/DC conversion unit 255 to the charging unit 257. The switching unit 256 converts a voltage of power, which has been output from the DC/DC conversion unit 255, into a voltage, which is required by the charging unit 257 or an element other than the charging unit 257 in the wireless power receiver 250, and outputs power having the converted voltage. For example, it is presumed that in the wireless power receiver 250, the DC/DC conversion unit 255 converts a voltage of the input power into 5 V and outputs power having 5 V as the converted voltage.

It is presumed that the charging unit 257 uses a voltage of 4 V, that a camera module (not shown) included in the wireless power receiver 250 uses a voltage of 3.5 V, and that a light-emitting module (not shown) included in the wireless power receiver 250 uses a voltage of 3 V. The switching unit 256 converts a voltage of 5 V of the converted power into 4 V, and outputs power having a voltage of 4 V to the charging unit 257. The switching unit 256 converts a voltage of 5 V of the converted power into 3.5 V, and outputs power having a voltage of 3.5 V to the camera module (not shown). The switching unit 256 converts a voltage of 5 V of the converted power into 3 V, and outputs power having a voltage of 3 V to the light-emitting module (not shown). The switching unit 256 receives the converted power from the DC/DC conversion unit 255, and typically, may set a voltage value of the converted power to a maximum allowable voltage value. For example, a voltage of output power of the typical DC/DC conversion unit 255 according to the related art is set to have a value of 5 V. Accordingly, a typical maximum allowable input voltage of the switching unit 256 is set to have a value of 5 V.

The charging unit 257 stores the converted power.

In this regard, when the efficiency of the rectification unit 254 is equal to 90% and that of the DC/DC conversion unit 255 is equal to 90%, an overall efficiency may be determined as 81% obtained by multiplying the former efficiency by the latter efficiency.

Figure 3:
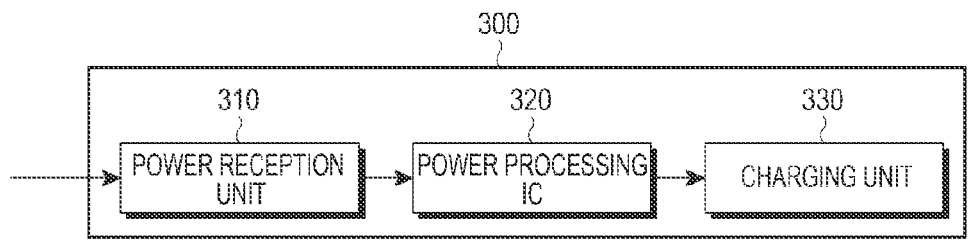
FIG. 3 illustrates a configuration of a wireless power receiver according to an embodiment of the present invention.

FIG. 3 illustrates a configuration of a wireless power receiver according to an embodiment of the present invention. Referring to FIG. 3, the wireless power receiver 300 includes a power reception unit 310, a power processing IC 320, and a charging unit 330.

The power reception unit 310 receives charging power from the wireless power transmitter (not shown). The power reception unit 310 includes, for example, a resonant circuit or a coil, and receives, for example, charging power having a voltage of 27 V.

The power reception unit 310 includes a wired charging interface includes, such as one capable of receiving charging power by wire from an external means for supplying power. Specifically, the power reception unit 310 receives charging power wirelessly or by wire. For example, the power reception unit 310 includes at least one of a means capable of wirelessly receiving charging power, such as a coil or a resonant circuit, and a means capable of receiving charging power by wire.

The power reception unit 310 receives charging power by using at least one of the means capable of wirelessly receiving charging power and the means capable of receiving charging power by wire, and outputs the received charging power to the power processing IC 320. The power reception unit 310 rectifies the received charging power, and outputs the rectified charging power. Otherwise, the power reception unit 310 outputs the received charging power, and a rectification unit (not shown) rectifies the output charging power and provides the rectified charging power to the power processing IC 320.

The power processing IC 320 converts a voltage of the input charging power into a voltage that the charging unit 330 uses, and outputs power having the converted voltage. For example, when the charging unit 330 uses a voltage of 4 V, the power processing IC 320 converts a voltage of the input charging power into 4 V, and outputs power having 4 V as the converted voltage. Otherwise, the power processing IC 320 converts a voltage of the input charging power into a voltage required by another element of the wireless power receiver 300, and outputs power having the converted voltage. Specifically, the power processing IC 320 converts a voltage of the input charging power into at least one voltage. For example, the power processing IC 320 converts a voltage of the charging power into multiple different voltages, and outputs power having each of the multiple different voltages along each of different paths.

For example, it is presumed that power provided by the power reception unit 310 or the rectification unit (not shown) has a voltage of 27 V, that the charging unit 330 uses a voltage of 4 V, that a camera module (not shown) included in the wireless power receiver 300 uses a voltage of 3.5 V, and that a light-emitting module (not shown) included in the wireless power receiver 300 uses a voltage of 3 V. The power processing IC 320 converts a voltage of 27 V of the input power into 4 V, and outputs power having a voltage of 4 V to the charging unit 330. The power processing IC 320 may also convert a voltage of 27 V of the input power into 3.5 V, and outputs power having a voltage of 3.5 V to the camera module (not shown).

The power processing IC 320 converts a voltage of 27 V of the input power into 3 V, and outputs power having a voltage of 3 V to the light-emitting module (not shown). The charging unit 330 stores the power having 4 V as the converted voltage, the camera module (not shown) may be driven by the power having 3.5 V as the converted voltage, and the light-emitting module (not shown) may be driven by the power having 3 V as the converted voltage.

As described above, charging power provided by the power reception unit 310 or the rectification unit (not shown) does not pass through the DC/DC conversion unit, but is directly received by the power processing IC 320. The power processing IC 320 converts a voltage of the directly-received charging power into a voltage used by each element of the wireless power receiver 300, including the charging unit 330, and outputs power having the converted voltage. For example, a maximum input value that the power processing IC 320 receives may be set to a voltage value of 30 V. The power processing IC 320 may be set to operate at a voltage which is less than 27 V.

The wireless power receiver 300 according to an embodiment of the present invention does not include the DC/DC conversion unit, which increases the overall charging efficiency of the wireless power receiver 300. It is possible to reduce a mounting area, and the wireless power receiver 300 can be mounted to a rear case instead of on a main board or a battery. It is also possible to simultaneously process charging power which is received wirelessly and by wire.

Figure 4:
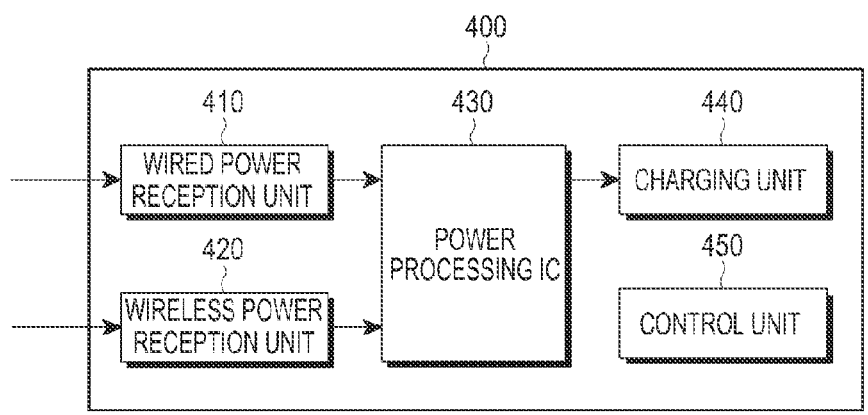
FIG. 4 illustrates a configuration of a wireless power receiver according to another embodiment of the present invention.

FIG. 4 illustrates a configuration of a wireless power receiver according to another embodiment of the present invention.

Referring to FIG. 4, the wireless power receiver 400 includes a wired power reception unit 410, a wireless power reception unit 420, a power processing IC 430, a charging unit 440, and a control unit 450. The wired power reception unit 410 includes an interface capable of receiving charging power by wire from an external means for supplying power.

The wireless power reception unit 420 includes a resonant circuit or a coil, and may wirelessly receive charging power from the wireless power transmitter (not shown).

The power processing IC 430 processes charging power provided by the wireless power reception unit 420 and charging power provided by the wired power reception unit 410. For example, the power processing IC 430 converts a voltage of the received charging power into a voltage that the charging unit 440 or each element uses, and outputs power having the converted voltage.

The power processing IC 430 simultaneously processes wirelessly-received charging power and charging power received by wire. Otherwise, the power processing IC 430 processes one charging power of wirelessly-received charging power and charging power received by wire, according to a preset priority. The control unit 450, for example, may control the power processing IC 430 to first process charging power received by wire. The power processing IC 430 may first process charging power received by wire under the control of the control unit 450.

The control unit 450 controls an overall operation of the wireless power receiver 400. As described above, when the power processing IC 430 simultaneously receives wirelessly-received charging power and charging power received by wire, the control unit 450 controls the power processing IC 430 to first process the charging power received by wire. However, this configuration is described for illustrative purposes only. Accordingly, the control unit 450 may control the power processing IC 430 to first process wirelessly-received power or simultaneously process power received by wire and wirelessly-received power.

As described above, the wireless power receiver 400 according to another embodiment of the present invention adopts a dual mode for processing power received by wire and wirelessly-received power together. The control unit 450 controls the power processing IC 430 to simultaneously process power received by wire and wirelessly-received power. The control unit 450 controls the power processing IC 430 to set a priority and process power received by wire and wirelessly-received power according to the set priority.

The power processing IC 430, for example, may first process power received by wire according to the set priority.

Figure 5:
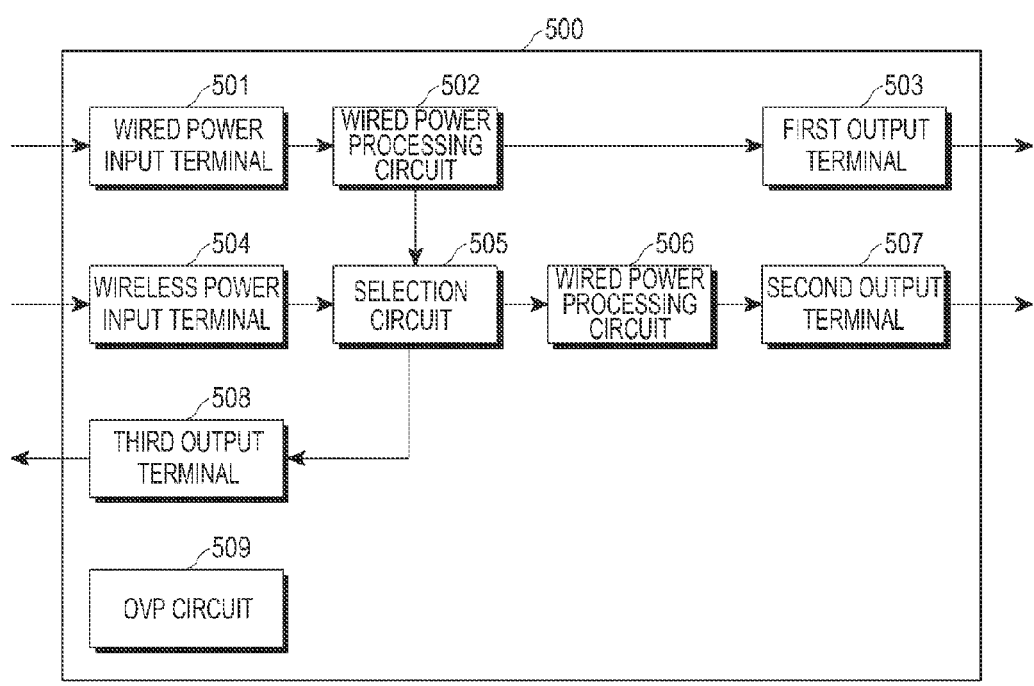
FIG. 5 illustrates a configuration of a power processing IC according to an embodiment of the present invention.

FIG. 5 illustrates a configuration of a power processing IC according to an embodiment of the present invention.

Referring to FIG. 5, the power processing IC 500 includes a wired power input terminal 501, a wired power processing circuit 502, a first output terminal 503, a wireless power input terminal 504, a selection circuit 505, a wireless power processing circuit 506, a second output terminal 507, a third output terminal 508, and an Over-Voltage Protection (OVP) circuit 509.

The wired power input terminal 501 receives, as input, charging power by wire from an external power supply source. The wired power input terminal 501, for example, may be implemented as an interface enabling the inlet or outlet of a cable for receiving and outputting power. The wired power input terminal 501 outputs the received charging power to the wired power processing circuit 502.

The wired power processing circuit 502 converts a voltage of charging power received by wire into a voltage that is used by a charging unit, such as a battery. For example, the wired power processing circuit 502 receives, as input, charging power having a preset voltage value from the wired power input terminal 501. The wired power processing circuit 502 converts a voltage of the charging power having the preset voltage value into a voltage that the charging unit uses, and outputs power having the converted voltage. The power having the voltage that the charging unit uses, into which the charging power having the preset voltage value has been converted and which has been output, is output to the charging unit through the first output terminal 503. The wired power processing circuit 502 converts a voltage of power into another voltage used by an element other than the charging unit in the wireless power receiver.

The wireless power input terminal 504 receives, as input, charging power from a wireless power reception unit, such as a resonant circuit. The wireless power input terminal 504 outputs the received charging power to the wireless power processing circuit 506.

The wireless power processing circuit 506 converts a voltage of the wirelessly-received charging power into a voltage that is used by a charging unit, such as a battery. For example, the wireless power processing circuit 506 receives, as input, charging power having a voltage of 27 V from the wireless power input terminal 504. The wireless power processing circuit 506 converts the charging power having a voltage of 27 V into the voltage that the charging unit uses, and outputs charging power having the converted voltage. The power having the voltage that the charging unit uses, into which the charging power having a voltage of 27 V has been converted and which has been output, is output to the charging unit through the second output terminal 507. The wireless power processing circuit 506 converts a voltage of power into another voltage used by an element other than the charging unit in the wireless power receiver.

The wired power processing circuit 502 and the wireless power input terminal 504 are connected to the selection circuit 505. Under the control of the control unit (not shown), the selection circuit 505 determines whether power to be processed is wirelessly-received power or power received by wire. When wirelessly-received power and power received by wire are simultaneously received, the selection circuit 505 determines whether power to be processed is the wirelessly-received power or the power received by wire. For example, when power received by wire is set to be processed before wirelessly-received power, the selection circuit 505 is controlled to process the power received by wire. In this case, the processing of the wirelessly-received power may be postponed.

The OVP circuit 509 protects the power processing IC 500 in such a manner as to prevent an over-voltage from being applied to the overall power processing IC 500. For example, the OVP circuit 509 may monitor a voltage of a particular part of the power processing IC 500. When a voltage of the particular part exceeds a threshold, the OVP circuit 509 may cut off or drop a voltage applied to the power processing IC 500. For example, the OVP circuit 509 may include at least one of at least one capacitor and at least one coil. When an over-voltage is applied to the power processing IC 500, the OVP circuit 509 may connect the at least one of the at least one capacitor and the at least one coil to at least one of the elements of the power processing IC 500. When the OVP circuit 509 is connected to the at least one of the elements of the power processing IC 500, a change in impedance may cut off or drop the over-voltage applied to the power processing IC 500.

The third output terminal receives and output signals for communicating with the control unit (not shown).

Figure 6:
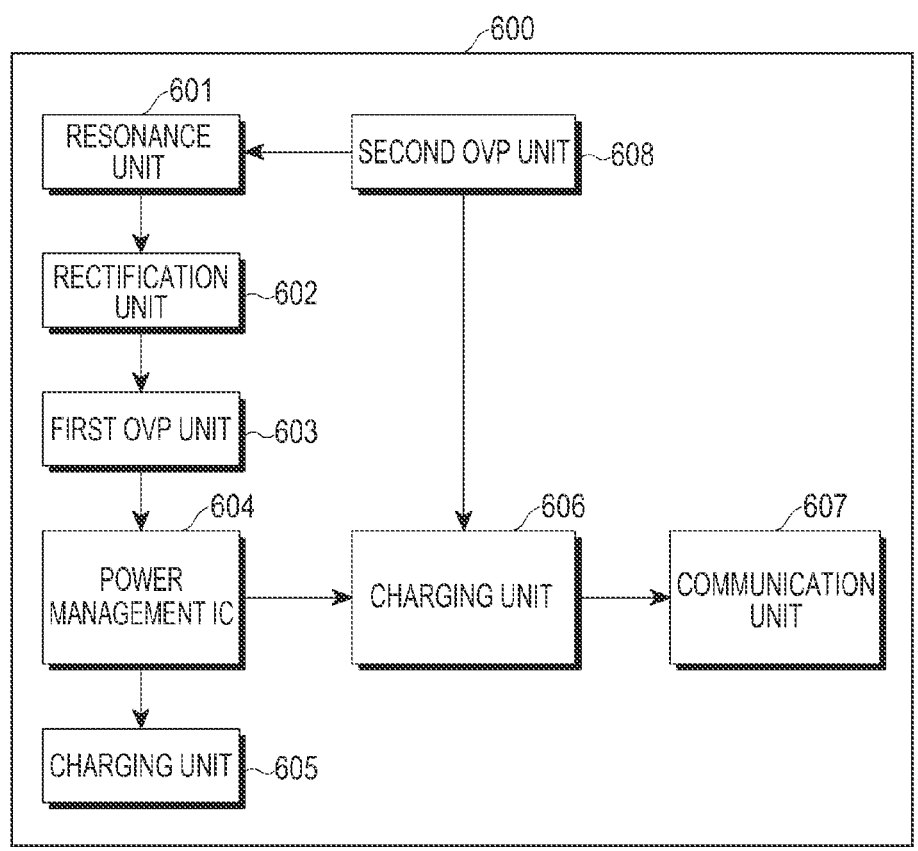
FIG. 6 illustrates a configuration of a wireless power receiver according to another embodiment of the present invention.

FIG. 6 illustrates a configuration of a wireless power receiver according to another embodiment of the present invention.

Referring to FIG. 6, the wireless power receiver 600 includes a resonance unit 601, a rectification unit 602, a first OVP unit 603, a power management IC 604, a charging unit 605, a control unit 606, a communication unit 607, and a second OVP unit 608.

The resonance unit 601 wirelessly receives charging power from the wireless power transmitter (not shown), such as in the resonance scheme. The rectification unit 602 rectifies the received charging power in the form of AC into power in the form of DC, and outputs the power in the form of DC. The rectification unit 602 includes at least one diode, and for example, may be implemented as a full diode bridge.

The control unit 606 controls the first OVP unit 603 to prevent an over-voltage from being applied to an output side of the rectification unit 602. For example, the first OVP 603 includes at least one of at least one capacitor and at least one coil. The control unit 606 monitors a voltage applied to the output side of the rectification unit 602. When a voltage applied to the output side of the rectification unit 602 exceeds a threshold, the control unit 606 performs a control operation for connecting the first OVP unit 603 to the rectification unit 602. The connection of the first OVP unit 603 to the rectification unit 602 changes an impedance of the wireless power receiver 600. When the impedance of the wireless power receiver 600 is changed, it is possible to prevent an over-voltage from being applied to the output side of the rectification unit 602.

The power management IC 604 converts a voltage of the rectified power, that the rectification unit 602 has provided, into a voltage that the charging unit 605 uses. Otherwise, the power management IC 604 converts a voltage of the rectified power, that the rectification unit 602 has provided, into a voltage that each element other than the charging unit 605 uses, and outputs power having the converted voltage. The charging unit 605 stores the received power.

The control unit 606 monitors voltages applied to the resonance unit 601 and the rectification unit 602. When a voltage applied to the resonance unit 601 exceeds a threshold, the control unit 606 controls the second OVP unit 608 to cause the applied voltage to be less than the threshold. When a voltage applied to the rectification unit 602 exceeds a threshold, the control unit 606 controls the first OVP unit 603 to cause the applied voltage to be less than the threshold.

The control unit 606 monitors a voltage applied to an input side of the power management IC 604. The control unit 606 generates a signal including a result of monitoring a voltage applied to the input side of the power management IC 604. For example, the control unit 606 outputs the generated signal to the communication unit 607, and controls the communication unit 607 to transmit the generated signal to the wireless power transmitter. The communication unit 607 may communicate with the wireless power transmitter by using a scheme, such as the Zig-Bee® scheme, the Bluetooth® scheme, the Bluetooth® low energy scheme, the short-range communication scheme, for example.

The wireless power transmitter adjusts the magnitude of power, depending on a voltage applied to the input side of the power management IC 604, and transmits the power, the magnitude of which has been adjusted, to the wireless power receiver 600. The signal that the control unit 606 generates may be named a "report signal", for example. The report signal has a data structure as shown in Table 1 below.

TABLE 1

| Frame type | Session ID | Sequence number | Network ID | Input voltage | Output voltage | Output current | Reserved |
|---|---|---|---|---|---|---|---|
| Report | 4 bits | 1 byte | 1 byte | 1 byte | 1 byte | 1 byte | 1 byte |

In Table 1, a frame type is a field indicating the type of a signal, and indicates that the relevant signal is a report signal. A session ID may be a field indicating a session ID that the wireless power transmitter adds to the wireless power receiver in order to control a wireless power network. The session ID field, for example, is assigned 4 bits. A sequence number field indicates sequential ordering of the relevant signal, and may be assigned 1 byte. The sequence number, for example, may increase by one in response to a step of transmitting and receiving signals. A network ID field indicates a network ID of the wireless power transmitter, and may be assigned 1 byte. An input voltage field indicates the value of a voltage applied to the input side of the power management IC 604 of the wireless power receiver 600, and may be assigned 1 byte. An output voltage field indicates the value of a voltage applied to an output side of the power management IC 604 of the wireless power receiver, and may be assigned 1 byte. An output current field indicates the value of a rated current flowing through the output side of the power management IC 604 of the wireless power receiver, and may be assigned 1 byte. The foregoing byte assignments are by way of example, and may be different.

As described above, the wireless power receiver 600 prevents an over-voltage during wireless charging, and transmits information on the applied voltages to the wireless power transmitter.

According to embodiments of the present invention, the wireless power receiver including the power processing IC that serves as a charger simultaneously with performing DC/DC conversion, and the control method thereof, are provided. The wireless power receiver does not include the DC/DC converter and the charger as independent elements, but includes the single power processing IC. Accordingly, it is possible to increase the overall charging efficiency of the wireless power receiver. The wireless power receiver includes the single power processing IC, so that it is possible to reduce the overall mounting area.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A wireless power receiver configured to receive charging power from a wireless power transmitter, the wireless power receiver comprising:
a power reception unit configured to receive the charging power from the wireless power transmitter;
a rectification unit configured to rectify charging power provided by the power reception unit, and output charging power in a form of Direct Current (DC);
a charging unit configured to store charging power; and
a power processing Integrated Chip (IC) that is connected to both the rectification unit and the charging unit, and is configured to convert a voltage of the rectified charging power, that the rectification unit has output, into at least one voltage, that an operation of the wireless power receiver requires, and output power having the at least one voltage.

2. The wireless power receiver as claimed in claim 1, wherein the power processing IC is configured to convert a voltage of the rectified charging power into multiple different voltages, and output power having each of the multiple different voltages along each of different paths.

3. The wireless power receiver as claimed in claim 1, wherein the power processing IC has a limited voltage value of 30 V, and operates at a voltage which is less than 27 V.

4. The wireless power receiver as claimed in claim 1, further comprising:
an over-current protection unit configured to change an impedance of the wireless power receiver in order to prevent a voltage value of the charging power from being greater than or equal to a threshold; and
a control unit configured to determine whether a magnitude of the charging power is greater than or equal to the threshold, and perform a control operation for connecting the over-current protection unit to the power reception unit when the magnitude of the charging power is greater than or equal to the threshold.

5. The wireless power receiver as claimed in claim 4, wherein the over-current protection unit comprises at least one of a capacitor and a coil.

6. The wireless power receiver as claimed in claim 1, further comprising a control unit configured to monitor a voltage applied to the power processing IC and generates a report signal including a result of monitoring the voltage.

7. The wireless power receiver as claimed in claim 6, further comprising a communication unit configured to communicate with the wireless power transmitter by using a preset communication scheme,
wherein the control unit controls the communication unit to transmit the generated report signal to the wireless power transmitter.

8. The wireless power receiver as claimed in claim 7, further comprising:
a first over-voltage prevention unit that is connected to the power reception unit and is configured to prevent an over-voltage from being applied to the power reception unit; and
a second over-voltage prevention unit that is connected to the rectification unit and is configured to prevent an over-voltage from being applied to the power reception unit.

9. The wireless power receiver as claimed in claim 8, wherein the control unit performs a control operation that prevents an over-voltage from being applied to the power reception unit, in such a manner as to perform a control operation for connecting the first over-voltage prevention unit to the power reception unit when a voltage applied to the power reception unit is greater than a preset first threshold, and performs a control operation that prevents an over-voltage from being applied to the rectification unit, in such a manner as to perform a control operation for connecting the second over-voltage prevention unit to the power reception unit when a voltage applied to the rectification unit is greater than a preset second threshold.

10. The wireless power receiver as claimed in claim 1, further comprising a wired power reception unit configured to receive charging power by wire.

11. The wireless power receiver as claimed in claim 10, further comprising a selection circuit configured to select charging power to be first processed from among charging power received by the wired power reception unit and charging power received by the wireless power reception unit, when charging power is simultaneously received by the wired power reception unit and by the wireless power reception unit.

12. The wireless power receiver as claimed in claim 11, wherein the selection circuit enables the charging power received by the wired power reception unit to be first processed, when charging power is simultaneously received by the wired power reception unit and by the wireless power reception unit.

13. A power processing Integrated Chip (IC) connected to a wireless power receiver configured to receive charging power from a wireless power transmitter, the power processing IC comprising:
a wireless power input terminal configured to receive, as an input, wirelessly-received charging power;
a wired power input terminal configured to receive, as an input, charging power received by wire;
a wireless power processing circuit configured to convert a voltage of the charging power, that the wireless power input terminal provides, into at least one voltage, that an operation of the wireless power receiver requires, and output power having the at least one converted voltage; and
a wired power processing circuit configured to convert a voltage of the charging power, that the wired power input terminal provides, into at least one voltage, that an operation of the wireless power receiver requires, and output power having the at least one converted voltage.

14. The power processing IC as claimed in claim 13, further comprising a selection circuit configured to select charging power to be first processed from among charging power received by the wired power input terminal and charging power received by the wireless power input terminal when charging power is simultaneously received by the wired power input terminal and by the wireless power input terminal.

15. The power processing IC as claimed in claim 13, further comprising an over-voltage protection circuit configured to monitor a voltage of a particular part of the power processing IC, and cut off or drop a voltage applied to the power processing IC when the voltage of the particular part exceeds a threshold.

* * * * *